United States Patent [19]

Eisenkraft

[11] 4,197,094
[45] Apr. 8, 1980

[54] METHOD AND APPARATUS FOR ELECTROMECHANICAL GAS SEPARATION

[76] Inventor: Bernard J. Eisenkraft, 1043 E. 81 St., Brooklyn, N.Y. 11236

[21] Appl. No.: 862,415

[22] Filed: Dec. 20, 1977

[51] Int. Cl.² .................... B01D 51/08; B01D 59/12; B01D 59/50
[52] U.S. Cl. .......................................... 55/15; 55/17; 55/267; 55/277; 55/343
[58] Field of Search .................... 55/15, 19, 277, 343, 55/267; 210/19, 542; 239/4, 102

[56] References Cited

U.S. PATENT DOCUMENTS

| | | | |
|---|---|---|---|
| 2,779,623 | 1/1959 | Eisenkraft | 239/4 |
| 3,109,721 | 11/1963 | Zenner et al. | 55/15 |
| 3,266,631 | 8/1966 | Snaper | 55/277 |
| 3,346,189 | 10/1967 | Eisenkraft | 239/4 |

FOREIGN PATENT DOCUMENTS

| | | | |
|---|---|---|---|
| 162580 | 3/1949 | Austria | 55/15 |
| 2449355 | 4/1976 | Fed. Rep. of Germany | 55/17 |
| 7307056 | 5/1973 | Netherlands | 210/19 |
| 7514822 | 12/1975 | Netherlands | 55/17 |

*Primary Examiner*—David L. Lacey

[57] ABSTRACT

Electromechanical apparatus is provided for continuous separation of gas components from a gas mixture having similar properties or atomic numbers. A vibrating bar, maintained in a resonant flexural mode by electromechanical means, achieves a density separation along its length from which partially enriched and depleted gases are separately withdrawn. Series cascaded stages provide for the degree of gas enrichment or separation required.

9 Claims, 5 Drawing Figures

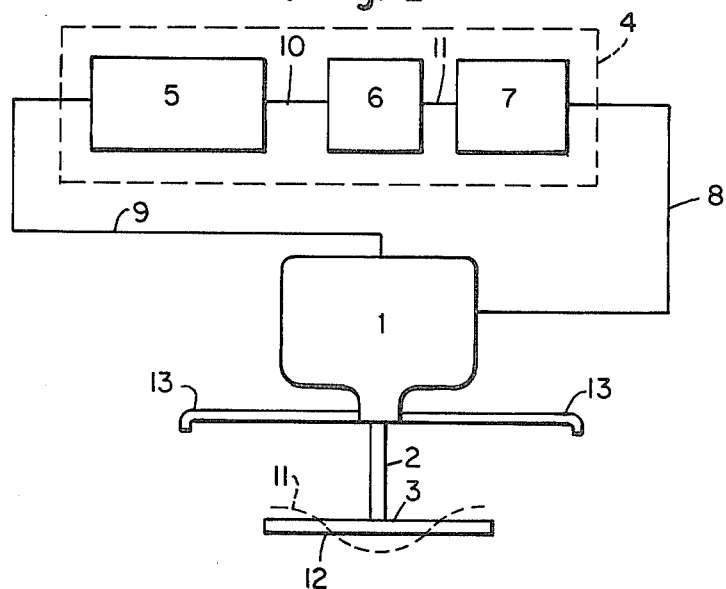
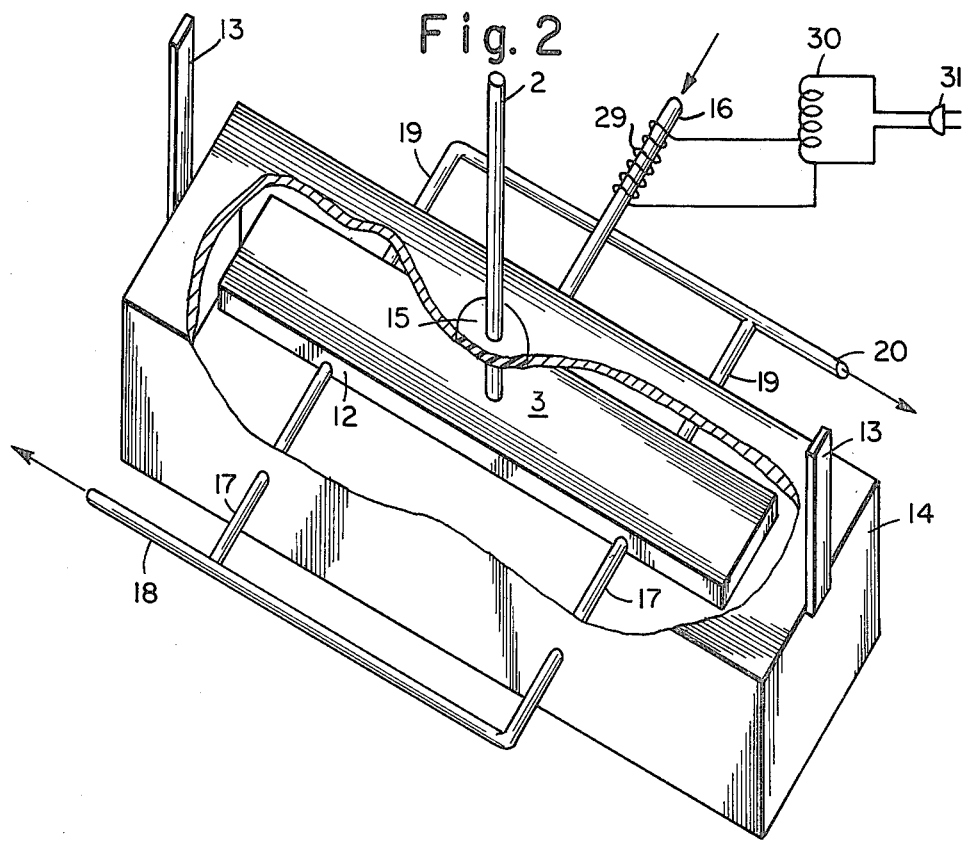

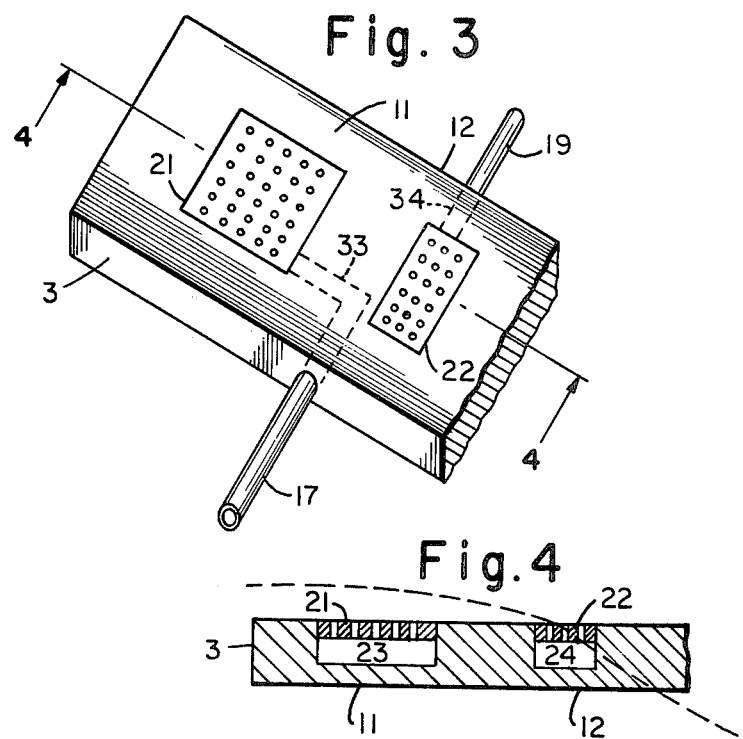
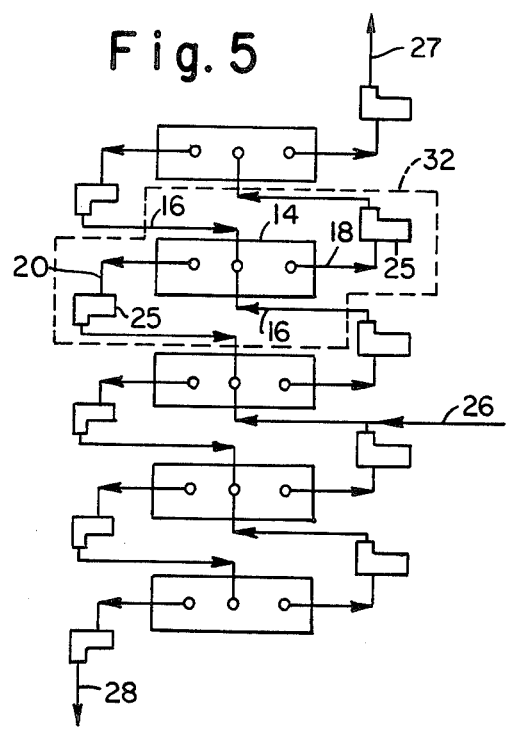

METHOD AND APPARATUS FOR ELECTROMECHANICAL GAS SEPARATION

BACKGROUND OF THE INVENTION

This present invention relates to apparatus to continuously separate and/or partially enrich a desired component in a mixture of feed gases and, specifically to electromechanical gas separator apparatus for this purpose.

The separation of a gas mixture to partially or fully recover a gaseous component by adsorption, absorption, diffusion and low temperature distillation is well known. Gaseous mixture composed of components having markedly different chemical and physical properties may be readily separated by such processes. When such chemical and physical properties of the gas components are very similar, gas separation by such well known methods becomes very difficult or impossible. It is the characteristic of difficult separation processes to require a series of cascaded separation stages, for the efficiency of single separation stages is quite small. Where processing equipment for gas separation requires precision machining and casting or expensive materials of construction, huge capital outlays are required to construct such plants. Also, large power requirements are necessary when the individual separation stages are operated in an inefficient manner. Therefor until now, difficult gas separation plants have been economically prohibitive for general industrial useage.

SUMMARY OF THE INVENTION

The present invention, in its preferred form, utilizes the inertial energy of a vibrating prismatic bar to furnish the work necessary to separate components of a gaseous mixture. Minimal energy is required when the vibrating bar is in a resonance condition thus, the disclosed apparatus is highly efficient in its energy usage. The physical dimensions and modes of operation of the vibrating bar are such that they are adaptable to be actuated by low cost, dependable electro-mechanical and electronic apparatus.

A vibrating prismatic bar can be actuated into a condition of flexural mechanical resonance to create alternating reqions of anti-nodes and nodes along the bar length. The anti-nodes of the bar are regions of maximum bar displacement in a direction perpendicular to the longitudinal length of the bar. The nodes are regions of minimal bar displacement. A gaseous fluid around such a resonating bar is set into rapid motion at the bar anti-nodes. A portion of the inertial energy in the resonating bar is transferred to the gas. The transferred energy is rapidly dissipated with distance from the bar surface therefor, it is the gaseous layer in close proximity to the bar that is of interest.

The motion induced in the surrounding gas by the resonating bar produces two effects useful for gas separation, i.e.: a differential acceleration effect and a pressure effect. First consider the gas layer over an anti-node region with the gas layer over a nodal region of the vibrating bar. Acceleration imparted to the gas over the anti-node is at a maximum whilst the acceleration imparted to the gas over the node is at a minimum. The difference in acceleration of the gas over the two adjacent regions causes the heavier gas fraction to increase in concentration at the nodal region and the lighter gas fraction to increase in concentration at the anti-nodal region. Secondly consider the gas layer only over the anti-nodal region of the vibrating bar. The moving bar surfaces induces a like movement in the surrounding gas thereby creating a radiation pressure in the gas. The root mean square (RMS) pressure of the vibrating gas is proportional to the vibrating bar amplitude, displacement and to the gas density. If a suitable pressure diffusion barrier is located adjacent to the agitated gas layer, the lighter gas fractions would preferentially be forced through the diffusion barrier to effect gas separation.

The design of my gas separation apparatus may be based upon the differential acceleration effect alone or in conjunction with the pressure diffusion effect. Since the gas separative work is effectively confined near the vibrating bar surfaces, the separated gas fractions are necessarily taken from the gas layers adjacent to the bar. One method of withdrawal of the separated gases may be accomplished by extending open ends of withdrawal pipes over, but not contacting, the anti-nodal and nodal bar surfaces. A second withdrawal method of the separated gases is to create gas reservoir cavities within the vibrating bar at anti-nodal and nodal regions, the cavities having entrance holes leading to the bar surfaces and exit conduits to lead separated gases to outside the vibrating bar. The latter withdrawal method is preferred for it assures better access to the gas layers nearest the bar surface and the entrance holes of the reservoir cavities at the anti-nodes could be constructed as a diffusion barrier.

The gas separation process is continuous in that new quantities of feed gas mixture is introduced to the vibrating bar as the separated gases are being withdrawn. A gas-tight housing, containing the vibrating bar and process gas, is required to isolate the gas separation process from atmospheric gas contamination. A feed pipe introduces the feed gas mixture to be separated into the housing. Two withdrawal pipe headers, one for the heavier enriched gas fraction and one for the lighter enriched gas fraction, carry the separated gases through the housing wall. Gas blowers, external to the housing, draw the gases through the separation apparatus. There is an optimum gas flow rate that is to be maintained for the highest yield of gas separation. The optimum flow rate is dependent upon the design and construction of the apparatus and is determined experimentally.

The present invention comprises a vibrating bar enclosed in a housing, feed pipe means to introduce a feed gas mixture into the housing so that the gas mixture is acted upon aerodynamically by anti-nodal regions of a vibrating bar, gas withdrawal means located at regions of the vibrating bar where a gas density separation occurs, electrical circuitry similar to that disclosed in my earlier U.S. Pat. Nos. 2,779,623 and 3,346,189 for maintaining the bar vibrating at a resonant flexural mode, and blower means to continuously maintain desired pressure and flow of the feed and separated gases through the separation apparatus. The feed pipe means and housing may be wrapped with a heating coil to maintain the fluids in a gaseous state and aid in component separation. Conversely, cooling means may be so employed. A pair of withdrawal pipes leading from adjacent nodal and anti-nodal regions of the vibrating bar contain different component compositions from the gas mixture in the feed pipe. The desired or enriched component is contained in one and the desired component is depleted in the other withdrawal pipe. The desired degree of separation of gas components is accomplished by operating a series of cascaded stages whereby the enriched component withdrawal pipe is connected to the feed pipe of the next enriching stage and the depleted component withdrawal pipe is connected to the feed pipe of the next depleting stage. The rate of gas flow through the housng is controlled by blowers and the flow shall not be so large as to negate the component segregation effect taking place at the vibrating bar, nor so low a rate as to decrease the separation yield capacity of the system.

The vibrating bar has been constructed in a variety of lengths, widths, thicknesses and materials and I have operated such in the resonant vibrating condition for long periods of time. Also, I have operated the vibrating bar successfully at elevated temperatures. A centrally clamped and driven free-free configuration of the vibrating bar is simple to construct and operate. The bar may be vibrated consistently in more than one resonant flexural mode to achieve a desired operating frequency for gaseous separation. It is necessary that any machining and adaptation of the vibrating bar be symmetrical about the central point, as far as possible, to achieve an optimum resonant condition. Withdrawal pipes connected to hollowed insides of the vibrating bar are best located at or near nodal points so as not to degrade the efficiency of vibration of the bar. Power requirements to maintain the bar vibrating in a resonant condition are small and, efficiency is further increased by the use of solid state devices to supply power.

One of the objects of my invention is to provide apparatus for efficiently separating gases having similar properties.

Another object of my invention is to provide an electromechanical gas separator that is relatively simple to construct of available materials and components.

A further object of my invention is to provide an electromechanical gas separator that utilizes a resonant vibrating member requiring little power for operation.

A still further object of my invention is to provide for the operation of a plurality of cascaded electromechanical gas separators to achieve a degree of desired gas component separation in an economical manner.

Still and other further objects of this invention will become apparent during the course of the following description and by reference to the accompanying drawings and the appended claims.

BRIEF DESCRIPTION OF THE DRAWINGS

Referring now to the drawings in which like numerals represent like parts in the several views:

FIG. 1 represents a view in elevation, partially diagrammatic, showing the vibrating bar attached to an electromechanical transducer and electronic power devices to drive the transducer.

FIG. 2 represents a perspective view of the vibrating bar within the housing, with gas feed and withdrawal pipes extending from the housing.

FIG. 3 represents a partial perspective view of the symmetrical vibrating bar showing withdrawal means for the partially separated gases.

FIG. 4 represents a longitudinal section of the vibrating bar of FIG. 3, taken along line 4—4 of FIG. 3.

FIG. 5 represents a diagrammatic view of a series of cascaded gas separator stages with blower means to form a continuous gas separation system.

DETAILED DESCRIPTION OF THE INVENTION

Referring now to the form of invention shown in FIGS. 1, 2, 3 and 4, electromechanical transducer 1 is provided with drive rod 2 rigidly connected to vibrating bar 3 at the center thereof. Electromechanical transducer 1 is powered by the circuitry encompassed by block 4, which circuitry is shown diagrammatically as comprising a preamplifier 5, phase shifter 6 and power amplifier 7. As taught in my U.S. Pat. 2,779,623, power amplifier 7 drives electromechanical transducer 1 through line 8, said electromechanical transducer 1 in turn reciprocating drive rod 2 thereby causing bar 3 to vibrate, it being apparent that the point of connection of drive rod 2 with vibrating bar 3 will be an anti-node. Feedback line 9, connected to means in the electromechanical transducer 1 electrically responsive to the vibrations of drive rod 2 and vibrating bar 3 which means as taught in my U.S. Pat. No. 3,346,189, communicates to preamplifier 5 an electrical signal indicative of the state of vibration of vibrating bar 3 to depart from vibrating at the resonant flexural mode to which it has initially been tuned to vibrate. This preamplified signal is fed through line 10 to phase shifter 6 and thence to power amplifier 7, whereby the output of power amplifier 7 is corrected and adjusted to maintain vibrating bar 3 at the desired resonant flexural mode, all as taught by my U.S. Pat. No. 2,779,623. In a resonant flexural mode, vibrating bar 3 will develop adjacent anti-nodal regions 11 and nodal regions 12 along its length. Support member 13 is rigidly attached to electromechanical transducer 1 and housing 14 to support the electromechanical transducer 1 and suspend freely the vibrating bar 3 in the housing 14. Flexible circular member 15 attached to drive rod 2 and housing 14, permits free movement of drive rod 2 while sealing in gases contained in housing 14. Gas mixture feed pipe 16 introduces feed gases into housing 14 to fill housng 14 and envelope vibrating bar 3. Withdrawal pipes 17 and 19 attached to vibrating bar 3 near nodal region 12 withdraw separated gases from vibrating bar 3, through housing 14 and join their respective withdrawal manifold headers 18 and 20. Where it is anticipated that the gaseous mixture only exists as a gas above ambient temperatures, insulated electrical heating element 29 may be wrapped around feed pipe 16 and connected to autotransformer 30, the latter being powered by means of power plug 31.

Partially separated gases over regions 11 and 12 of vibrating bar 3 are drawn through orifices or porous openings 21 and 22 in the surface of vibrating bar 3 into respective cavities 23 and 24 of vibrating bar 3. The permeability of openings 21 or the porosity of openings 21 and 22 are individually determined in regards to the characteristics of the gas mixtures and rate of gas flow to cooperate with and complement the density separation process occurring immediately over anti-nodal region 11 and nodal region 12 of vibrating bar 3. Withdrawal pipe 17 cc mmunicates with cavity 23 and withdrawal pipe 19 communicates with cavity 24 via exit conduits 33 and 34 to respectively withdraw segregated gases from surface regions of vibrating bar 3.

Referring now to the form of invention as shown in FIG. 5, the gas separation system is provided with a multiplicity of similar gas separation stages as encompassed by block 32, having housing 14 and all of the elements of FIGS. 1, 2, 3 and 4. Additionally, blower means 25 connected to withdrawal pipes 18 and 20 created the pressure to force the gas streams to flow through the gas separator stage. The original gas mixture 26 is fed into the separation system by way of feed pipe 16, into a housing 14 which contains a gas most similar in composition to the original gas mixture 26. Should the desired gas component exit the withdrawal pipe 18 enriched, then the above separation stages would become progressively enriched to the desired composition at outlet line 27. Below the feed stage, the gases would be progressively depleted to the desired depleted gas composition at outlet line 28.

While I have shown the best embodiments of my invention now known to me, I do not wish to be limited to the exact structures shown and described herein, but may use such substitutions, modifications or equivalents as are embraced within the scope of the specification and drawings and claims.

I claim:

1. Gas separation apparatus comprising:
   (a) a housing to contain a gas mixtures,
   (b) a member positioned and arranged within said housng so as to be vibrated at a resonant mode to establish anti-nodal and nodal regions,
   (c) vibrating means connected to said member so as to maintain said vibrating member vibrating at said resonant mode,
   (d) feed means to introduce a feed gas mixture into said housing so as to envelope said vibrating member,
   (e) First withdrawal means to separately withdraw lighter enriched fractions of said gas mixture from said anti-nodal regions of said vibrating member to outside of said housing,
   (f) second withdrawal means to separately withdraw heavier enriched fractions of said gas mixture from said nodal regions of said vibrating member to outside of said housing,
   (g) means to flow a controlled quantity of said gas mixture through said housing.

2. Apparatus as in claim 1, further comprising:
   (h) heating means positioned and arranged with respect to said feed means, to maintain said feed gas mixture in the gaseous state in said housing.

3. Gas separation apparatus comprising:
   (a) a housing to contain a gas mixture,
   (b) an elongated member positioned and arranged within said housing to be mechanically vibrated at a resonant flexural mode with adjacent anti-nodal and nodal regions formed along the length of said elongated member,
   (c) electromechanical vibrating means connected to said member so as to maintain said vibrating elongated member mechanically vibrating at said resonant flexural mode,
   (d) a drive rod operatively connecting said electromechanical vibrating means and the central portion of said vibrating elongated member and transmitting vibrations to said vibrating elongated member,
   (e) feed pipe means to introduce a feed gas mixture to the interior of said housing,
   (f) first withdrawal means separately withdrawing lighter enriched fractions of said gas mixture, said first withdrawal means comprising a cavity within said vibrating elongated member positioned at said anti-nodal region, said cavity in flow communication with a surface of said vibrating elongated member by means of small orifices in the surface of said member adjacent said cavity, said cavity in flow communication with a conduit extending outside said vibrating elongated member, said conduit in flow communication with a withdrawal pipe extending outside of said housing,
   (g) second withdrawal means separately withdrawing heavier enriched fractions of said gas mixture, said second withdrawal means comprising a cavity within said vibrating elongated member at said nodal region, said cavity in flow communication with the surface of said vibrating elongated member by means of small orifices in the surface of said member adjacent said cavity, said cavity in flow communication with a conduit extending outside said vibrating elongated member, said conduit in flow communication with withdrawal pipes extending outside of said housing,
   (h) blower means connected to said withdrawal means to flow a controlled quantity of said gas mixture through said housing.

4. Apparatus as in claim 3, further comprising:
   (i) said conduits of said first and second withdrawal means extending outside said vibrating elongated member and are positioned at said nodal regions of said vibrating elongated member to minimize damping said mechanical vibrations of said vibrating elongated member.

5. Apparatus as in claim 3, further comprising:
   (j) an electrical heating element wrapped around a portion of said feed pipe means to heat said feed gas mixture,
   (k) an auto transformer connected to said heating element and to an electrical supply, said auto transformer to control the temperature of said feed gas mixture.

6. Apparatus according to claim 3 for separating a gaseous mixture in which said small orifices of said first withdrawal means constructed and arranged so as to provide a diffusion barrier which effects further degree of gas separation.

7. A method of separating a lighter enriched gas fraction from a heavier enriched gas fraction in a gas mixture, including the steps of:
   (a) enveloping a resonating prismatic bar which is resonating at a flexural mode having adjacent antinodal and nodal regions formed along the length of said bar with said gas mixture, and
   (b) extracting the lighter enriched gas fraction from said anti-nodal regions of said resonating prismatic bar, and
   (c) extracting the heavier enriched gas fraction from said nodal regions of said resonating prismatic bar.

8. Staged gas separation apparatus for separating a feed gas mixture into at least one lighter component enriched fraction and at least one heavier component enriched fraction comprising:
   (a) a group of staged housings, each of said housings containing a vibrating member for gas separation,
   (b) means for generation of mechanical energy at resonant frequencies of said vibrating member, said generation means connected to said vibrating member to establish anti-nodal and nodal regions in said vibrating member,
   (c) means for introducing said feed gas mixture into a first selected stage gas separator housing to enrich said lighter component gas fraction at said antinodal regions and to enrich said heavier component gas fraction at said nodal regions, (d) first means for separately withdrawing said lighter component enriched gas fraction from said first selected stage gas separator housing as feed gas mixture to a selected second stage gas separator housing also operating in the same manner as said first stage gas separator housing, (e) second means for separately withdrawing said heavier component enriched gas fraction from said first selected stage gas separator housing as feed gas mixture to a selected third stage gas separator housing also operating in the same manner as said first stage gas separator housing, (f) third means for separately withdrawing said lighter enriched gas fraction from said selected second stage gas separator housing, (g) fourth means for separately withdrawing said heavier enriched gas fraction from said selected third stage gas separator housing, (h) blower means between said selected first and second stage gas separator housings and further blower means between said selected first and third stage gas separator housings to flow controlled quantities of said gas mixture through said housing.

9. Apparatus according to claim 8 for separating a feed gas mixture into desired lighter and heavier component enriched fractions comprising a plurarity of said groups of staged housing.

* * * * *